(12) United States Patent
D'Almeida et al.

(10) Patent No.: US 7,501,742 B2
(45) Date of Patent: Mar. 10, 2009

(54) MECHANICAL ACTUATOR COMPRISING AN ACTIVE LINEAR PISTON

(75) Inventors: Oscar D'Almeida, Boulogne Billancourt (FR); Mathias Woydt, Berlin (DE); Jean-Thierry Audren, Saint Remy les Chevreuses (FR)

(73) Assignee: Sagem Defense Securite, Paris (FR)

( * ) Notice: Subject to any disclaimer, the term of this patent is extended or adjusted under 35 U.S.C. 154(b) by 116 days.

(21) Appl. No.: 11/443,662

(22) Filed: May 30, 2006

(65) Prior Publication Data

US 2007/0114886 A1    May 24, 2007

(30) Foreign Application Priority Data

May 31, 2005    (FR)    ................... 05 05475

(51) Int. Cl.
*H01L 41/08*    (2006.01)
(52) U.S. Cl. ..................................... 310/328
(58) Field of Classification Search .............. 310/328, 310/323.02
See application file for complete search history.

(56) References Cited

U.S. PATENT DOCUMENTS

| 3,684,904 | A | * | 8/1972 | Galutva et al. ............... 310/328 |
| 4,269,903 | A |   | 5/1981 | Clingman et al. |
| 4,570,096 | A | * | 2/1986 | Hara et al. ................... 310/328 |
| 5,751,090 | A | * | 5/1998 | Henderson ................... 310/328 |
| 7,045,932 | B2 | * | 5/2006 | Xu et al. .................. 310/323.17 |
| 7,218,035 | B2 | * | 5/2007 | Khajepour et al. .......... 310/328 |

FOREIGN PATENT DOCUMENTS

| DE | 36 40 212 A1 | 6/1988 |
| FR | 2 402 532 A | 4/1979 |
| FR | 2 552 182 A | 3/1985 |
| FR | 2 819 650 A | 7/2002 |
| WO | WO 92/08909 A | 5/1992 |

\* cited by examiner

*Primary Examiner*—Mark Budd
(74) *Attorney, Agent, or Firm*—Blakely, Sokoloff, Taylor & Zafman LLP

(57) ABSTRACT

The invention relates to an actuator comprising a sliding sleeve and an active piston, control means, wherein the sliding sleeve and the piston have at their interface at least one pair of friction layers, characterised in that at least one friction layer is made of a material selected from the following:
an oxide of a Ti and Cr alloy;
a zirconium matrix stabilised by $Sc_2O_3$ and/or $Al_2O_3$ and/or $Cr_2O_3$;
a zirconium oxide in tetragonal phase stabilised by $Y_2O_3$;
an alloy of Al, Fe and at least one other element.

14 Claims, 4 Drawing Sheets

MECHANICAL ACTUATOR COMPRISING AN ACTIVE LINEAR PISTON

GENERAL TECHNICAL FIELD

This invention relates to a mechanical actuator comprising an active linear piston, in particular a piston made of piezoelectric material.

Such actuators advantageously have applications in braking devices, clutches or flaps, especially for automobile vehicles or aircraft.

STATE OF THE ART

We already know, especially from the patent FR 2 702 895, active actuators that comprise a sliding sleeve and a piston capable of moving axially in said sleeve, said piston comprising a plurality of successive sections, made of active materials, and more especially piezoelectric materials. Generally, the sections of these actuators are controlled so that some dilate perpendicularly to the direction in which the piston moves and thus block in the sliding sleeve, and others so that they dilate in the direction in which the piston moves and thus extend so as to cause part of the piston to move, while the other part is blocked in the sliding sleeve.

The active piston actuators need to be especially efficient and have sufficiently long working lives to be used especially in braking or clutch devices for automobile vehicles or aircraft. By way of example, an automobile braking device must be able to withstand 1 million actuations.

The actuating force of an actuator depends on the blocking force multiplied by the coefficient of friction. It is therefore easy to understand that the higher the coefficient of friction, the greater the actuating force for a same blocking force.

The difficulty is that with dry friction, friction materials with a coefficient greater than 0.6 or even 0.8, under a geometrical pressure of around 50 MPa, are subject to sticking (welding of micro-asperities). In the case of the friction materials sticking, the actuator no longer works. On the other hand, dry friction materials that are not subject to sticking have coefficients of friction of less than 0.4 or even 0.3, even lower at 0.005, which are insufficient for good efficiency of the actuator.

The actuator proposed in FR 2 819 650 has friction materials and/or layers with coefficients of friction greater than 0.6, independently of the relative humidity, the temperature and the atmospheric environment they are used in.

To obtain this result, the sliding sleeve of the actuator and the piston have at their interface at least one pair of friction layers, wherein said pair of friction layers have static and dynamic coefficients of friction which, for a stress between the piston and the sleeve of less than 100 MPa, preferably 50 MPa, are greater than 0.6. The pair of friction layers moreover has surface finishes such that:

their asperity curve radius R verifies $0.005$ mm$<<$R$<<$1 mm, and;

the mean arithmetic $\lambda a$ and mean quadratic $\lambda q$ wavelengths of the asperities verify $0.5$ μm$<\lambda a$ and $\lambda q<10$ μm.

In these conditions, and with the surface finishes as defined by FR 2 819 650, the materials of the friction layers used for dry friction do not suffer sticking or abrasion.

The actuator proposed by FR 2 819 650 allows particularly low wear rates to be achieved, and especially wear rates lower than $10^{-7}$ or even $10^{-8}$ mm$^3$/Nm.

The materials described in FR 2 819 650 are preferably selected from:

a zirconium oxide ($ZrO_2$) stabilised by $<8\%$ in weight of MgO or $<13$-$16\%$ of $CeO_2$, in monoclinical, tetragonal and/or cubic phases;

a magneli phase of titanium oxide $\gamma$-$Ti_3O_5$ and/or $TiO_{2n-1}$, where $4 \leq n \leq 10$; or a nitrided aluminium alloy, for example AlSi9 up to AlSi17 (AA 6xxx alloys or AlMgX alloys, where X represents one or more metals, AA 5xxx, etc.).

A braking system is a safety system that must operate in all conditions.

Whereas it has been observed that the materials mentioned above, with the exception of $CeO_2$ and $ZrO_2$, experience hydrolysis in certain conditions.

For example, the magneli phases $TinO_{2n-1}$, where $4 \leq n \leq 10$ oxidises above 360° C. in the presence of air to create the stoechiometric phase $TiO_2$. This oxidation phenomenon accelerates in the presence of humidity.

For example again, the hydrolytic stability of the tetragonal phase of the zirconium oxide stabilised by $Y_2O_3$ (the latter material is also known as Yttria) is not satisfactory. In fact, the zirconia (another name for the zirconium oxide stabilised by $Y_2O_3$) is sensitive to water and steam, such that the tetragonal phase is destabilised by the formation of $Y(OH)_3$ and is transformed into a monocline phase.

Again by way of example, the nitrided aluminium alloys mentioned in FR 2 819 650 are also hydrolysed in the presence of water or steam in certain temperature conditions to form alumina, hydrates and/or hydroxides of alumina, that have lubricating properties.

The hydrolysis of these materials causes a drop in their performances that is incompatible with the life cycle of an aircraft and the desired safety of the actuators.

PRESENTATION OF THE INVENTION

The invention proposes to overcome at least one of the previously mentioned disadvantages.

To this end, the invention proposes an actuator comprising a sliding sleeve and a piston which comprises a plurality of sections made of an active material, control means capable of acting on said materials so that the sections block with respect to the sliding sleeve or extend longitudinally according to a sequence which leads to the axial movement of the piston in the sliding sleeve, wherein the sliding sleeve and the piston have at their interface at least one pair of friction materials, characterised in that at least one friction layer is a material selected from the following:

an oxide of a Ti and Cr alloy, where the oxide is in the form of a stabilised solid solution and/or in the form of a non-stoechiometric solid solution;

a zirconium matrix stabilised by $Sc_2O_3$ and/or $Al_2O_3$ and/or $Cr_2O_3$;

a zirconium oxide in tetragonal phase stabilised by $Y_2O_3$, where the size of the oxide grains are less than 100 nm; and/or any possible combination of these materials.

The invention is advantageously completed by the following characteristics, taken singly or according to their possible combinations:

said pair of friction materials has static and dynamic coefficients of friction which, for a stress between the sleeve and the piston of less than 100 MPa, are greater than 0.6, wherein said pair of friction layers have among others surface conditions such that:

their asperity curve radius R verifies $0.005$ mm$<<$R$<<$1 mm, and;

the mean arithmetic $\lambda a$ and mean quadratic $\lambda q$ wavelengths of the asperities verify 0.5 µm<$\lambda a$ and $\lambda q$<10 µm.

at least one friction layer has a surface finish whose curve radius R of the asperities verifies 0.03 mm<R<1 mm.

said pair of friction layers has static and dynamic friction coefficients which, for a stress between the sleeve and the piston of less than 100 MPa, are greater than 0.6, wherein said pair of friction layers have among others surface conditions such that:

the arithmtic $\Delta a$ or quadratic $\Delta q$ gradient verify: 0.0050<($\Delta a$, or $\Delta q$)<0.5°, and the means arithmetic $\lambda a$ and quadratic $\lambda q$ wavelengths of the asperities verify 0.5 µm<$\lambda a$ and $\lambda q$<10 µm.

a friction layer has a thickness of less than 100 µm and preferably between 4 and 6 µm;

the stabilised solid solution of the Ti and Cr alloy are in the form $Ti_{n-2}Cr_2O_{2n-1}$ with $6 \leq n \leq 9$;

the non stoechiometric form of the oxide of the Ti and Cr alloy is in the form of a solid solution of $TiO_2$ and $Cr_2O_3$, preferably in a form chosen from: $Cr_2Ti_2O_7$, $Ti_6Cr_2O_{15}$, $Ti_7Cr_2O_{17}$, $Cr_2Ti_8O_1$, $Cr_2Ti_5O_{13}$, $Cr_2Ti_4O_{11}$, $Cr_{0.12}Ti_{0.78}O_{1.74}$, $Cr_{0.222}Ti_{0.778}O_{1.889}$, $Cr_{0.286}Ti_{0.714}O_{1.857}$ or $Cr_{0.46}Ti_{0.54}O_{1.77}$.

the zirconium matrix comprises between 0.5 and 13% in the number of moles of $Sc_2O_3$ and/or between 0.1 and 0.9% in weight of $Al_2O_3$ and/or $Cr_2O_3$.

the sliding sleeve is made of an alloy of Al, Fe and at least one other element, the alloy comprising at least approximately 80% in weight of Al and at least between 0.1 and 15.0% in weight of Fe.

the alloy of Al, Fe and at least one other element is chosen from:

an Al—Fe—V—Si alloy with between 0.1 and 15% in weight of Fe, between 0.3 and 15% in weight of V, between 0.1 and 5% of Si, and the rest in Al, the alloy preferably being the AA 8009 alloy, which is to say Al-8.5Fe-1.3V-1.7Si; and/or an Al—Fe—Ce alloy, with between 0.1 and 15% in weight of Fe, between 0.1 and 9% in weight of Ce, the rest being in Al, the alloy preferably being Al-8.3Fe-4.0Ce and/or Al-7.0Fe-6.0Ce; and/or an Al—Fe—V alloy, with between 0.1 and 15% in weight of Fe, between 0.1 and 5% in weight of V, the rest being in Al, the alloy preferably being Al-12Fe-3V; and/or an Al—Fe—Mo alloy, with between 0.1 and 15% in weight of Fe, between 0.3 and 9% in weight of Mo, the rest being in Al, the alloy preferably being Al-8Fe-2Mo; and/or an Al—Fe—Cr—Ti alloy, with between 0.5 and 10% in weight of Fe, between 0.4 and 8% in atoms of Cr, between 0.3 and 5% in atoms of Ti, the rest being in Al, the alloy preferably being Al84.5Fe7Cr6.3Ti2.5;

the alloy has fine homogenous grains and comprises a quantity of less than 0.3% in weight with respect to the total weight of the alloy of Mg, Zr, Ce and/or Sr (inoculation) and/or a quantity of less than 0.05% in weight of Ni;

the alloy comprises aluminium or silicon nitrate to obtain an alloy containing up to 2% in weight of Nitrogen.

The invention relates to an actuator comprising a sliding sleeve and a piston which comprises a plurality of sections in an active material, control means capable of acting on said materials so that the sections block with respect to the sliding sleeve or extend longitudinally according to a sequence which leads to the axial movement of the piston in the sliding sleeve, characterised in that the control means are capable of applying to each of the sections a tension which shortens said section and blocks it in the sliding sleeve, and an inverse tension which frees said section with respect to said sleeve and which extends it longitudinally inside it, these two tensions being applied successively to said section during a sequence in which the piston is moved, each section thus being used to block and extend during such a sequence, wherein the sliding sleeve and the piston have at their interface at least one pair of friction layers, wherein said pair of friction layers have a wear rate of less than $10^{-7}$ mm$^3$/Nm and static and dynamic coefficients of friction which, for a stress between the sleeve and the piston of less than 50 MPa, are greater than 0.6.

The invention has many advantages.

In particular, the actuator has better performances and an increased life, due to the resistance of the friction materials to humidity, water and/or steam, across wider temperature ranges.

The actuator can be used across wider and higher ranges of temperature and pressure, for longer.

DESCRIPTION OF THE FIGURES

Other characteristics, purposes and advantages of the invention will become clear from the following description, provided purely by way of illustration and in no way restrictive, and which must be read with regard to the appended drawings in which.

DETAILED DESCRIPTION

General Structure

Figure 1:
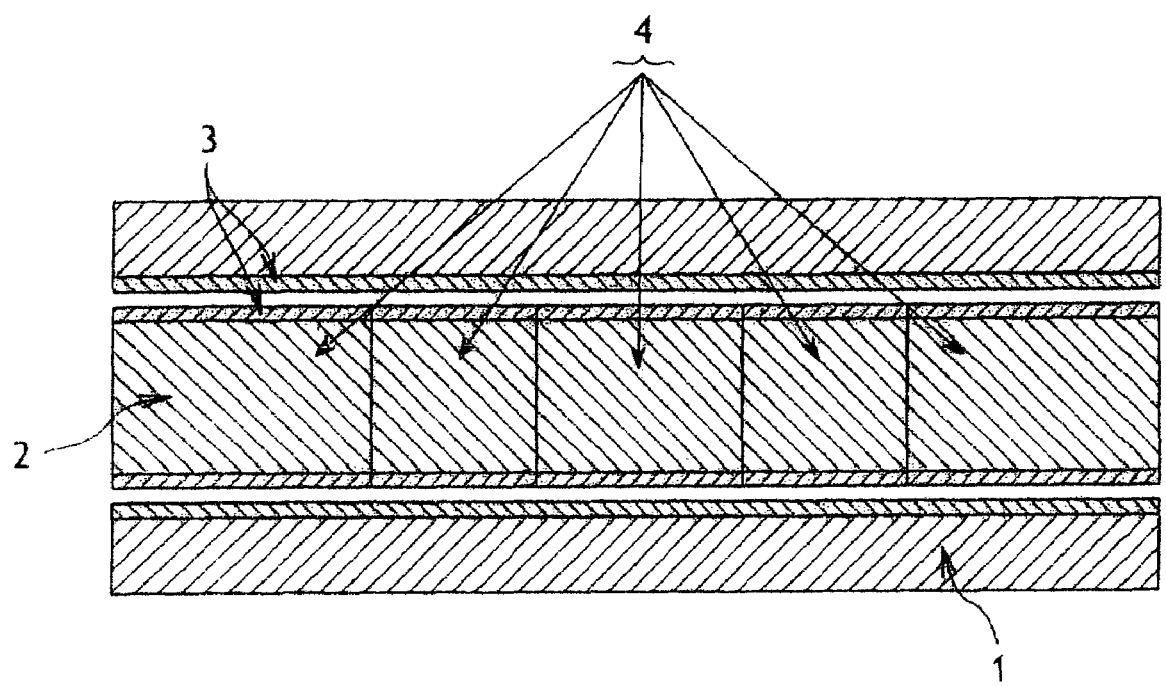
FIG. 1 is a longitudinal section of one embodiment of the invention.

The document FR 2 800 028 to which we may advantageously refer, reveals an actuator as shown in FIG. 1. The actuator has a cylinder or a sliding sleeve 1 and a piston 2 capable of sliding axially in said cylinder.

The piston 2 may be composed of a plurality of sections of piezoelectric ceramics 4.

Each section 4 is equipped with electrodes (not shown in FIG. 1) which allow it to be controlled independently of the others. The sections 4 are for example made of multi-layer ceramic, or in monolithic or monocrystal ceramic, the use of multi-layer piezoelectric ceramics has however the advantage of permitting the use of lower electrical currents. The electrodes permit said sections 4 to be controlled either to expand them transversally so that they block by friction on the sliding cylinder 1, or to extend them longitudinally. The sections are actuated according to operating sequences alternating blocking and extension so as to either move the piston or when it cannot move any further, to create a force, which is for example used as a braking force.

Layers of friction materials, reference n° 3, cover totally or partially the sleeve 1 and the piston 2.

We will examine the selection of these materials below, as well as the techniques used to deposit them, machine them and their surface finish.

Selection of Friction Materials

The materials of the layers 3 are brought into contact and dry friction in the tribo-system formed by the sleeve 1 and the piston 2.

These materials are chosen so that this tribo-system has a coefficient of friction (COF) that is particularly high, and especially greater than 0.6 and preferably greater than 0.8, regardless of the variation of the operational parameters, these parameters principally being:

the relative humidity;
the corrosive salts used on frozen roads and runways as well as the polyglycols for used to defrost aircraft;
the temperature which for certain applications can vary between $-40°$ C. ($-60°$ C. for aircraft) to 200 or $300°$ C.;
the geometrical contact pressures (non-Hertzian) which can reach 50 MPa.

We know that the materials that are traditionally used as friction materials with high coefficients of friction in the tribo-systems with dry friction have high wear rates (greater than $10^{-6}$ mm$^3$/Nm) associated to the sticking wear mechanisms.

In return, the materials traditionally used for dry friction that have low wear rates are generally not friction materials; on the contrary, they are generally solid lubricants or tribo-systems lubricated by oils in liquid or paste form, added to the materials.

The materials which are used for the layers 3 of the structure proposed have the characteristic of possessing both a high coefficient of friction and a low wear rate.

Their dry friction wear rate is in fact lower than $10^{-7}$ mm$^3$/Nm and preferably lower than $3 \times 10^{-8}$ mm$^3$/Nm, which normally corresponds to the limit/mixed lubrication system.

These very low wear rates permit a mechanical working life of approximately 15 years to be guaranteed, under the most unfavourable working conditions. This working life would be equal to an increase in the clearance between a sleeve and an active piston of less than 4 µm for a piston measuring 25.4 mm in diameter, for one million actuations with geometrical contact pressures of 50 MPa.

The materials used for the friction layers 3 are advantageously chosen from the following materials:

an oxide of a Ti and Cr alloy, where the oxide is in the form of a stabilised solid solution and/or in the form of a non-stoechiometric solid solution;
a zirconium matrix stabilised by $Sc_2O_3$ and/or $Al_2O_3$ and/or $Cr_2O_3$;
a zirconium oxide in tetragonal phase stabilised by $Y_2O_3$, where the size of the oxide grains are less than 100 nm.

The stabilised solid solution of the Ti and Cr alloy, is preferably in the form of $Ti_{n-2}Cr_2O_{2n-1}$ with $6 \leq n \leq 9$.

The non stoechiometric form of the oxide of the Ti and Cr alloy is preferably in the form of a solid solution of $TiO_2$ and $Cr_2O_3$. Even more preferably, in a form chosen from: $Cr_2Ti_2O_7$, $Ti_6Cr_2O_{15}$, $Ti_7Cr_2O_{17}$, $Cr_2Ti_8O_1$, $Cr_2Ti_5O_{13}$, $Cr_2Ti_4O_{11}$, $Cr_{0.12}Ti_{0.78}O_{1.74}$, $Cr_{0.222}Ti_{0.778}O_{1.889}$, $Cr_{0.286}Ti_{0.714}O_{1.857}$ or $Cr_{0.46}Ti_{0.54}O_{1.77}$.

The zirconium matrix comprises between 0.5 and 13% in the number of moles of $Sc_2O_3$ and/or between 0.1 and 0.9% in weight of $Al_2O_3$ and/or $Cr_2O_3$.

Any of these materials may be used in the formation of each of the two layers of friction pairs. They permit better resistance to humidity (water and steam) and increase the performances of the pairs over a higher range of temperatures. A mix of these materials may also be used.

Figure 4:
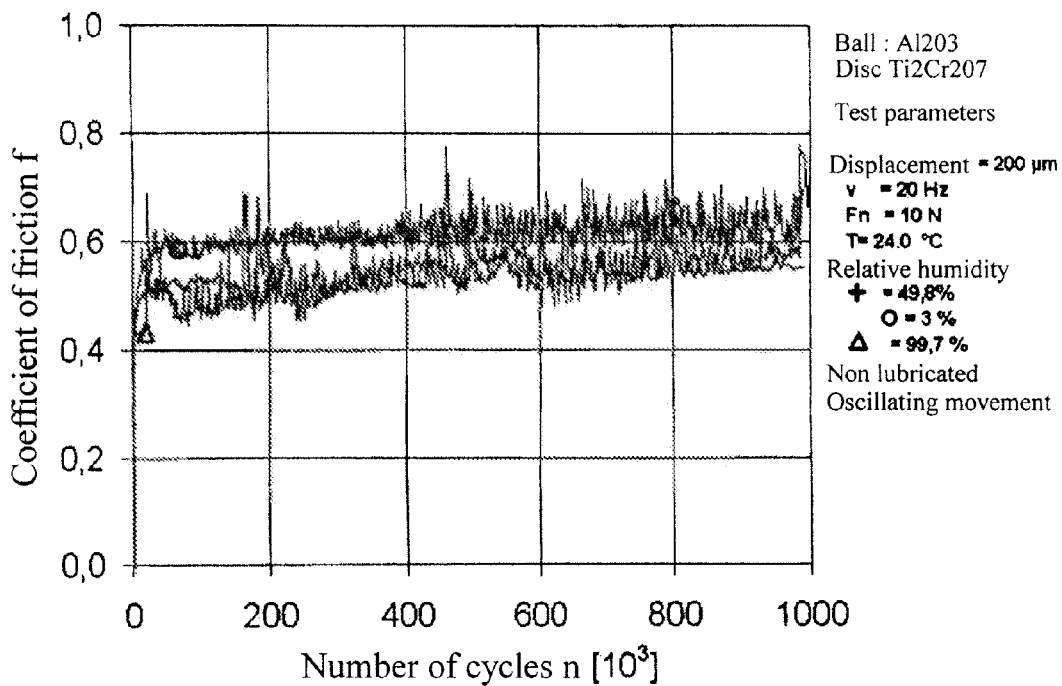
FIG. 4 shows the evolution of the coefficient of friction of the pair aluminium/$Ti_2Cr_2O_7$ for three levels of relative humidity (3%, 49.8% and 99.7%) in oscillation mode up to $10^6$ cycles.
Figure 7:
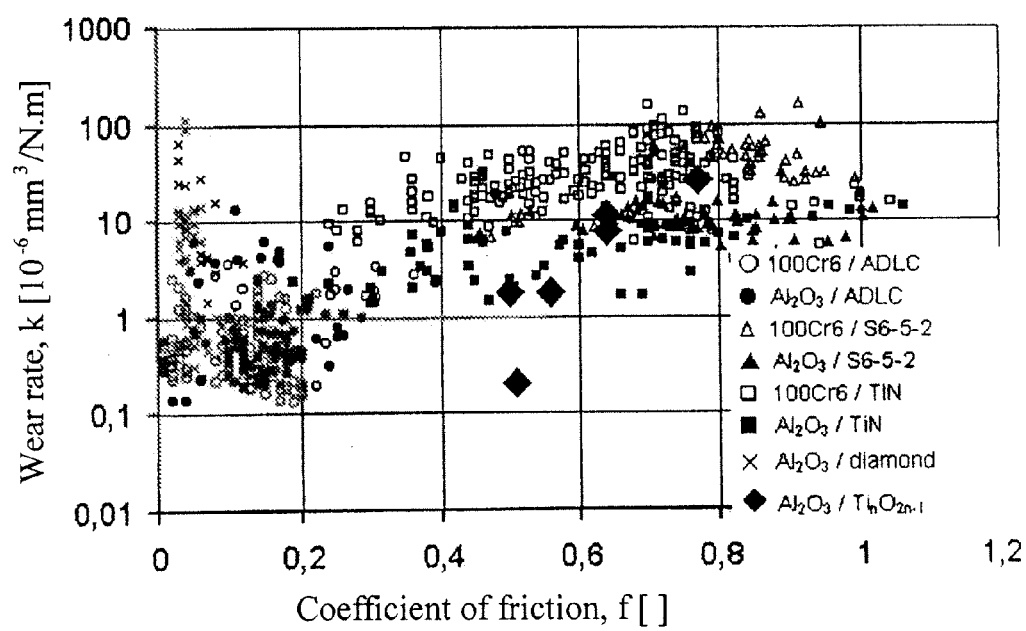
FIG. 7 shows a compilation of the wear rates according to the dry coefficient of friction (COF) of various pairs of ceramic pairs in non lubricated oscillation mode.

FIG. 4 shows the values of the coefficients of friction of the alumina/$Ti_2Cr_2O_7$ pair. The coefficients of friction are shown for a relative humidity (HR) value of 3% (curve with a circle), 49.8% (curve with a cross) and 99.7% (curve with a triangle). The COFs are higher than those of an alumina/diamond pair or hydrogenated carbon (DLC—diamond like carbon) as shown in FIG. 7, even though the wear rates of the alumina/$Ti_2Cr_2O_7$ pair are comparable with those of a diamond/hydrogenated carbon pair. The COFs of the alumina/$Ti_2Cr_2O_7$ pair are virtually independent of humidity and reach the desired value of 0.6 without adhesive wear and are associated to low wear rates.

Figure 5:
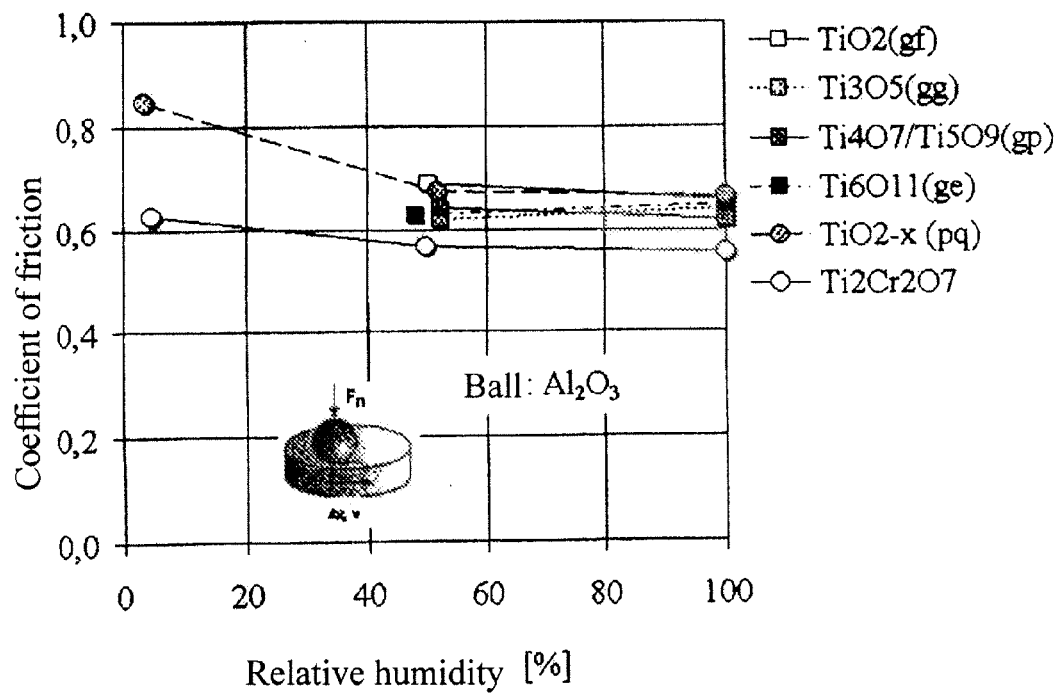
FIG. 5 shows values of coefficients of friction in different levels of relative humidity in non lubricated oscillation mode, after $10^6$ cycles.
Figure 6:
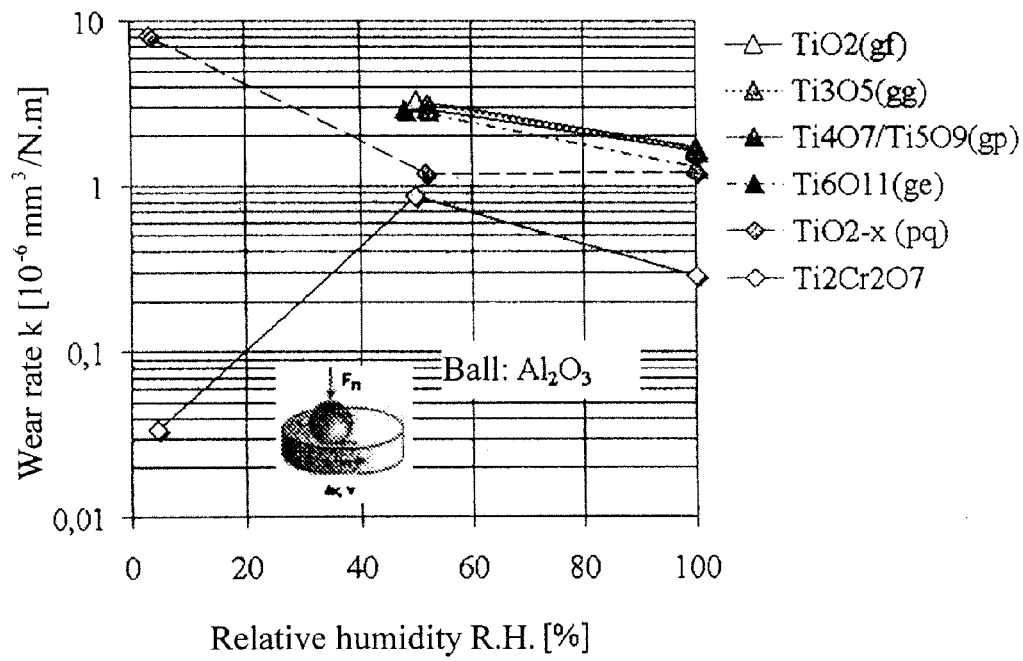
FIG. 6 shows the rate of wear of different magneli phases and $Ti_2Cr_2O_7$ in different levels of relative humidity in non lubricated oscillation mode, after $10^6$ cycles.

FIG. 5 shows the values of the coefficients of friction in different conditions of relative humidity in non-lubricated oscillation mode after $10^6$ cycles, for different materials in magneli phase and for the $Ti_2Cr_2O_7$ of the invention (friction against alumina for all materials). It can be observed that the COFs of the magneli phases (unaltered) are higher than those of the $Ti_2Cr_2O_7$ (by around 0.1), but that the Ti2Cr2O7 has a much lower wear rate, as shown by FIG. 6.

The selection of a material in an actuator application must reunite and optimise friction and wear. It is for this reason that $Ti_2Cr_2O_7$ is a good material for this application.

Depositing the Layers

The friction materials are deposited on the mechanical parts of the system designed to slide against one another.

Furthermore, the blocking force is determined by the clearance between the sleeve and the active piston. This clearance must be small enough to permit contact between the sleeve and the piston when dilated, but large enough to allow the piston to slide when it has extended.

The thickness of the friction layers once machined must not be greater than the blocking clearance of the actuator. They must always be less than 100 µm and preferably less than around 4 to 6 µm in the machined condition.

Consequently, these layers must define single layers or thin multi-layers. They are therefore deposited by techniques which may be those summarised in table 1 below. It contains Anglo-Saxon designations for those techniques that are generally used by those skilled in the art.

TABLE 1

Physical deposit in gaseous phase (PVD)

Radio frequency (RF) sputtering (bombardment)
Magnetron reactivity sputtering
Electron-beam directed vapour-deposition (EB-DVD)
Chemical deposit in gaseous phase (CVD)

PE-CVD (Plasma enhanced CVD)
LP-CVD (Low-pressure CVD)
Deposit in chemical solution Sol-gel (solution-gelation)
MOD (Metallo-organic decomposition)
Molten metal deposit LPE (Liquid phase epitaxy)
Chemical coatings
Anodic titanium oxidation TABLE 1-continued Ti and Al Electro-chemical coatings
Thermal spraying The temperature of the room during the depositing process must be equal to $T_{curie}$ minus approximately 10 degrees Kelvin; preferably a deposit temperature is chosen equal to $T_{curie}$ minus approximately 100 degrees Kelvin. This selection of temperature avoids the piezoelectric materials from being damaged.

Figure 2:
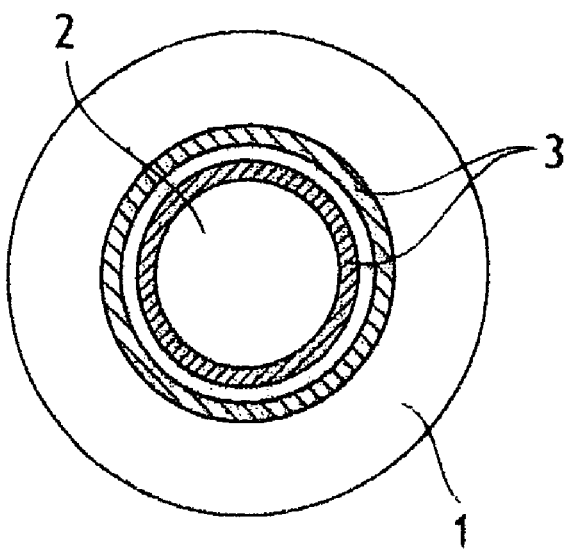
FIG. 2 is a cross-section of one embodiment of the invention.
Figure 3:
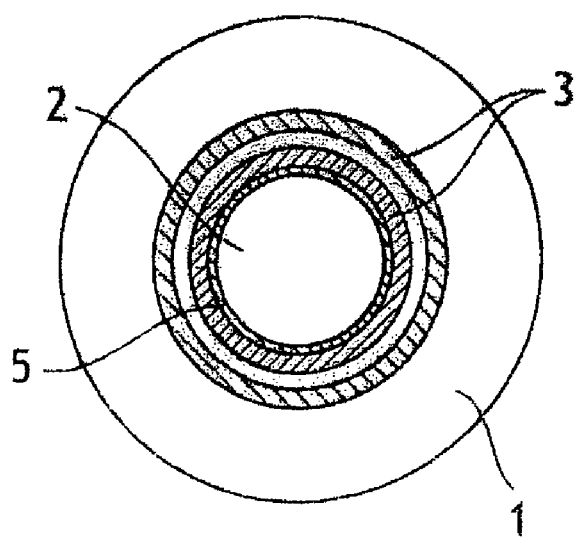
FIG. 3 is a cross-section of another embodiment of the invention.

Moreover, for certain combinations of friction layers and piezoelectric substrates it may be advantageous to add, as shown in FIG. 2, an intermediate layer 5 between the material of the active piston and the friction layer to improve the sticking of the latter.

In fact, the shearing forces due to the blocking of the piston in its sleeve are high. Consequently, depending on the applications, this adhesive force of the layers on their support must always be able to resist a shearing force of 5 MPa, and preferably a shearing force of 20 MPa or even 50 MPa.

This intermediate layer 5 may be advantageously composed of the following elements taken separately or in any possible combination (alloy):

Nickel;
Nickel with a proportion in weight of 2 to 25% of phosphorous;
Iron;
Chromium;
Titanium;
Silicon or aluminium deposited by CVD electrochemical processes, thermal spraying and/or PVD.

In addition, it is possible to carry out radial segmentation of the layers after they have been deposited to reduce the stresses due to thermal expansion.

Topography of the Layers

The topography of the friction layers permits the desired friction and resistance properties to be obtained.

Given that the linear values per tribo-element are preferably less than 2-3 µm, the condition of the initial surfaces of the sliding mechanical parts must be those desired from the first use and created during machining. In fact, if the system operates as planned, the surface finishes with the tribological properties are virtually invariable in time. There is therefore no need to bed these parts in.

This is why in fact a surface treatment is carried out, to obtain from the first application layers whose surface topography (statistical distribution and form of the micro-asperities at the surface) corresponds to what the operator desires.

It should be pointed out that normally, the active piston works by blocking and does not slide. However, due to problems of actuation speed or settings between the sections, it is possible that the asperities have to function with a sliding component without effectively sliding against one another. This is generally called the "stick-slip" mode by those skilled in the art.

We are thus looking for a surface finish permitting elastically made contacts, i.e. without wear due to ruptures of sticky contacts ("stick") for an extension of less than 10 µm.

The topography of the surface of the piston and the sleeve is a parameter that is as important as the selection of friction materials. It permits the elastic functioning of the asperities: the asperities called on elastically do not wear, thus the surface condition remains virtually unchanged during the working life of the system.

Traditionally, a surface finish is characterised by roughness values.

We propose here two approaches that are different from the traditional approach, but which provide, for the surface finish in question, more or less the same characteristic.

In a first approach, we check the surface condition so that the curve radii R of the asperities verify 0.005 mm<<R<<1 mm, and preferably 0.03 mm<R<0.1 mm.

For an estimation of the curve radii of the asperities of a given metal surface, we can advantageously refer to the following publication:

"Modelisation of microgeometrical topography—materials and techniques"—n° 3-4-2000.

The curve radius of the asperities of a ceramic surface may—if these asperities are considered to be spherical—be obtained from a topographical analysis.

In fact we have:

$$R = \frac{\pi R_a}{2\sigma_0 \sigma_4} = \frac{\pi}{2}\left(\frac{E^A}{H(T)}\right)^2 \frac{1}{\Psi^2} R_a$$

Where $$\Psi = \sqrt{\sigma_0 \sigma_4}\, \frac{E^*}{H(T)'} \quad Ra = \frac{\sqrt{2}\, \sigma_0}{\sqrt{\pi}}$$

And $$\frac{1}{E^*} = \frac{1-v_1^2}{E_1} + \frac{1-v_2^2}{E_2}$$

$\Psi$ is equal to the plasticity index.
If $\Psi<0.6$, the contact is elastic
If $0.6<\Psi<1$, the contact is elastic-plastic.
If $\Psi>1$, the contact is supposed to be plastic.
$E^*$ is the equivalent Young's modulus.
$E_1$ and $E_2$ are the Young's moduli of the two materials of the friction layers.
$v_1$ and $v_2$ are the Poisson coefficients.
$\sigma_0$ is the Gaussian distribution gap of the asperity summits (which corresponds to $R_q$ or $R_{ms}$ according to the standard ISO 4287).
$\sigma_4$ is the Gaussian distribution gap of the profile curves (moment of order 4) calculated from a numerical differentiation of the roughness profile.

Generally, for smooth ceramic surfaces, we choose for the approach advantageously R [mm] as being more or less equal to $5\times10^3$ to $5\times10^4$ times $R_a$ [µm].

In another approach, where the asperities are modelled by cones, we can use the values:

$\Delta_a$ (mean arithmetic gradient or slope of the profile), or
$\Delta_q$ (mean quadratic gradient or slope of the profile),
These two gradients or slopes are standardised by the standard EN ISO 4287-98, where;

$$\tan(\Delta_a, \Delta_q) \approx \sqrt{(\sigma 0, \sigma 4)}$$

to facilitate the surface condition desired.

In particular, we advantageously impose a gradient verifying:

$$0.005° < (\Delta_a\ ou\ \Delta_q) < 0.5°$$

Such curve radii or gradients are preferred as they define one form of ideal asperities for elastic functioning.

In parallel to this check of the curve radius or gradient of the asperities, we check the density of the asperities by taking into consideration another parameter which is the mean wavelength of the asperities.

There are several wavelength parameters defined in the standard EN ISO 4287. These wavelengths are $\lambda_a$ and $\lambda_q$ where:

$$\lambda_a = 2\pi R_a/\Delta_a \text{ and } \lambda_q = 2\pi R_a/\lambda_q.$$

($R_a$ corresponds to a DIN roughness with uniform asperity heights).

The surface finish must be such that:

$$0.5 \text{ µm} < \lambda_a \text{ and } \lambda_q < 10 \text{ µm}.$$

Advantageously by way of example, the desired surface finish may be obtained for ceramic materials with an $R_a$ of less than 20 nm and preferably less than 10 nm.

The friction pairs that we have just described are advantageously used in the actuators which equip brake callipers, and more particularly the brake callipers of aircraft or automobile brakes, or clutch systems.

The layers 3 of the friction materials cover the sleeve or the cylinder 1 and piston 2 totally or partially.

Below we will examine the selection of materials of the sleeve or the cylinder 1 as well as the technique used to manufacture them.

According to the invention, the material of the sleeve or the cylinder 1 is an alloy of Al, Fe and, at least one other element, the alloy comprising at least around 80% in weight of Al and at least between 0.1 and 15.0% in weight of Fe.

The alloy of Al, Fe and at least one other element is selected from the following:
- an Al—Fe—V—Si alloy with between 0.1 and 15% in weight of Fe, between 0.3 and 15% in weight of V, between 0.1 and 5% of Si, and the rest in Al, the alloy preferably being the AA 8009 alloy, which is to say Al-8.5Fe-1.3V-1.7Si; and/or
- an Al—Fe—Ce alloy, with between 0.1 and 15% in weight of Fe, between 0.1 and 9% in weight of Ce, the rest being in Al, the alloy preferably being Al-8.3Fe-4.0Ce and/or Al-7.0Fe-6.0Ce; and/or
- an Al—Fe—V alloy, with between 0.1 and 15% in weight of Fe, between 0.1 and 5% in weight of V, the rest being in Al, the alloy preferably being Al-12,Fe-3, 3V; and/or
- an Al—Fe—Mo alloy, with between 0.1 and 15% in weight of Fe, between 0.3 and 9% in weight of Mo, the rest being in Al, the alloy preferably being Al-8Fe-2Mo; and/or
- an Al—Fe—Cr—Ti alloy, with between 0.5 and 10% in weight of Fe, between 0.4 and 8% in atoms of Cr, between 0.3 and 5% in atoms of Ti, the rest being in Al, the alloy preferably being Al84.5Fe7Cr6.3Ti2.5;
- an Al—Yb/Gd-TR alloy, with between 1.0 and 20% in weight of Yb or Gd, and between 0.1 and 1.0% in weight of rare earth, the alloy preferably being Al14Yb4Y.

Those skilled in the art know that there are several processes possible to make such an alloy. It is therefore possible to make the above mentioned alloys by rapid solidification or atomisation followed by extrusion to achieve shear resistance values at ambient temperature of up to 1600 MPa with amorphous or partially amorphous aluminium matrices (crystalline-amorphous mix).

However, these processes are not really adapted to manufacturing many tons and the manufacture of complex parts required for an aircraft or automobile application. Furthermore, the shear resistance of the alloys made using rapid solidification drops after annealing and above a recrystallisation temperature in general above 300 to 350° C.

This invention thus proposes to make the cylinder/sleeve in the above mentioned aluminium alloy by gravity or pressure casting, followed by degassing in a vacuum and/or in a preheated mould at between 350-650° C. This manufacturing process may be adapted to the fabrication of large volumes and complex parts required for aircraft or automobile applications.

The use of the materials of the invention permits easier and cheaper manufacture of the actuator parts.

Another advantage of making the parts by casting is that the parts can be made in one piece, or form a substrate that may be coated. In this way, the fact that the cylinder/sleeve is in one piece favours the transfer of heat to this part, which is far from the active materials that are heat sensitive.

In preference, the above mentioned aluminium alloys may, just before casting, undergo a step to refine the grains, to make them homogenous by adding to the alloy a quantity of less than 0.3% in weight with respect to the total weight of the composition of Mg, Zr, Ce and/or Sr (inoculation) and/or a quantity of less than 0.05% in weight of Nickel.

Similarly, just before casting, the aluminium alloys mentioned above may undergo an alloying step with aluminium or silicon nitride to obtain an alloy containing up to 2% in weight of Nitrogen. The alloys thus form nitride dispersoids. The alloying step is carried out at a pressure of more than 2 bar in a Nitrogen atmosphere or a $N_2$/Ar mix so that the Nitrogen remains diluted in the liquid alloy.

For an application in an actuator and in comparison with grey cast iron, these modified aluminium alloys show, even when only made by casting in thin strips, good shear resistance when hot (T<500° C.). Their shear resistance is in fact comparable to that of grey cast iron with 3.7% in weight of [C], where $R^{500° C.}_m \sim 100$ MPa and $R^{500° C.}_{0.02} \sim 40$ MPa. Furthermore, for these alloys there is no formation of liquid phases for a melting temperature of less than 600° C., as is the case for Al—Si—Mg—Zn alloys.

The inventors have also found that the modulus of elasticity of the Al84.5Fe7Cr6Ti2.5 alloy made using gravity casting has a Young's modulus E with the values:
at ambient temperature $E^{RT}=104.1$ GPa; and
at 500° C. $E^{500° C.}=83$ GPa.

Comparable to grey cast iron with 3.7% in weight of [C]. It can be observed that these values are significantly higher (~44% at ambient temperature) to the aluminium alloys disclosed in FR 2 844 933 (67-74 GPa for the Al—Si, Al—Mg, Al—Zn—Mg, Al—Cu alloys for example).

Gravity casting of Al8.5Fe1.3V1.7Si has a Young's modulus E with the following values:
$E^{RT}=85.7$ GPa; and
$E^{500° C.}=65$ GPa.

These results are obtained without the use of ceramic particles, trichites or fibres.

The modified aluminium alloys in an actuator application have an intrinsic gain in rigidity and hot shear resistance associated to an operating temperature of up to 500° C. It can be understood that this represents a large technical advantage (gain in weight in particular) as well as in cost.

The invention claimed is:

1. An actuator comprising a sliding sleeve and a piston having a plurality of sections made of an active material, wherein control means are capable of acting on said materials so that the sections block with respect to the sliding sleeve or extend longitudinally according to a sequence which leads to the axial movement of the piston in the sliding sleeve, wherein the sliding sleeve and the piston have at their interface at least one pair of friction layers, wherein at least one friction layer is a material selected from the following:

an oxide of a Ti and Cr alloy, where the oxide is in the form of a stabilised solid solution and/or in the form of a non-stoechiometric solid solution;

a zirconium matrix stabilised by $Sc_2O_3$ and/or $Al_2O_3$ and/or $Cr_2O_3$;

a zirconium oxide in tetragonal phase stabilised by $Y_2O_3$, where the size of the oxide grains is less than 100 nm; and/or any possible combination of these materials.

2. The actuator of claim 1, in which said pair of friction layers have static and dynamic coefficients of friction which, for a stress between the piston and the sleeve of less than 100 MPa, are greater than 0.6, said pair of friction layers moreover have surface finishes such that:

their asperity curve radius R verifies 0.005 mm<<R<<1 mm, and;

the mean arithmetic λa and mean quadratic λq wavelengths of the asperities verify 0.5 μm<λa and λq<10 μm.

3. The actuator of claim 2, in which at least one friction layer has a surface finish whose asperity curve radius R verifies 0.03 mm<R<1 mm.

4. The actuator of claim 1, in which said pair of friction layers has static and dynamic friction coefficients which, for a stress between the sleeve and the piston of less than 100 MPa, are greater than 0.6, wherein said pair of friction layers have among others surface conditions such that:

the arithmetic Δa or quadratic Δq gradient verifies: 0.005°< (Δa, or Δq)<0.5°, and the means arithmetic λa and quadratic λq wavelengths of the asperities verify 0.5 μm<λa and λq<10 μm.

5. The actuator of claim 1, in which the friction layer has a thickness of less than 100 μm and preferably between 4 and 6 μm.

6. The actuator of claim 1, in which the stabilised solid solution of the Ti and Cr alloy are in the form $Ti_{n-2}Cr_2O_{2n-1}$ with 6<n<9.

7. The actuator of claim 1, in which the non-stoechiometric form of the oxide of the Ti and Cr alloy is in the form of a solid solution of $TiO_2$ and $Cr_2O_3$, preferably in a form chosen from: $Cr_2Ti_2O_7$, $Ti_6Cr_2O_{15}$, $Ti_7Cr_2O_{17}$, $Cr_2Ti_8O_1$, $Cr_2Ti_5O_{13}$, $Cr_2Ti_4O_{11}$, $Cr_{0.12}Ti_{0.78}O_{1.74}$, $Cr_{0.222}Ti_{0.778}O_{1.889}$, $Cr_{0.286}Ti_{0.714}O_{1.857}$ or $Cr_{0.46}Ti_{0.54}O_{1.77}$.

8. The actuator of claim 1, in which the zirconium matrix comprises between 0.5 and 13% in the number of moles of $Sc_2O_3$ and/or between 0.1 and 0.9% in weight of $Al_2O_3$ and/or $Cr_2O_3$.

9. The actuator of claim 1, in which the sliding sleeve is made of Al, Fe and at least one other element, the alloy having at least substantially 80% in weight of Al and at least between 0.1 and 15.0% in weight of Fe.

10. The actuator of claim 9, in which the alloy of Al, Fe and at least one other element is chosen from:

an Al—Fe—V—Si alloy with between 0.1 and 15% in weight of Fe, between 0.3 and 15% in weight of V, between 0.1 and 5% of Si, and the rest in Al, the alloy preferably being the AA 8009 alloy, which is to say Al-8.5Fe-1.3V-1.7Si; and/or an Al—Fe—Ce alloy, with between 0.1 and 15% in weight of Fe, between 0.1 and 9% in weight of Ce, the rest being in Al, the alloy preferably being Al-8.3Fe-4.0Ce and/or Al-7.0Fe-6.0Ce; and/or an Al—Fe—V alloy, with between 0.1 and 15% in weight of Fe, between 0.1 and 5% in weight of V, the rest being in Al, the alloy preferably being Al-12Fe-3V; and/or an Al—Fe—Mo alloy, with between 0.1 and 15% in weight of Fe, between 0.3 and 9% in weight of Mo, the rest being in Al, the alloy preferably being Al-8Fe-2Mo; and/or an Al—Fe—Cr—Ti alloy, with between 0.5 and 10% in weight of Fe, between 0.4 and 8% in atoms of Cr, between 0.3 and 5% in atoms of Ti, the rest being in Al, the alloy preferably being Al84.5Fe7Cr6.3Ti2.5.

11. The actuator of one of claims 9 or 10, in which the alloy has fine homogenous grains and comprises a quantity of less than 0.3% in weight with respect to the total weight of the alloy of Mg, Zr, Ce and/or Sr (inoculation) and/or a quantity of less than 0.05% in weight of Ni.

12. The actuator of one of claims 9 or 10, in which the alloy comprises aluminium or silicon nitrate to obtain an alloy containing up to 2% in weight of Nitrogen.

13. The actuator of claim 2, in which said pair of friction layers have static and dynamic coefficients of friction which, for a stress between the piston and the sleeve of less than 50 MPa, are greater than 0.6.

14. The actuator of claim 1, in which said pair of friction layers have a wear rate of less than 10-7 mm3/Nm.

* * * * *